United States Patent
Trauninger

(10) Patent No.: US 7,751,024 B2
(45) Date of Patent: Jul. 6, 2010

(54) MOTION PICTURE CAMERA HAVING A FILM MAGAZINE AND MEANS FOR CLEANING THE FILM

(75) Inventor: Walter Trauninger, Laab im Walde (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 819 days.

(21) Appl. No.: 10/573,612

(22) PCT Filed: Sep. 23, 2004

(86) PCT No.: PCT/DE2004/002163

§ 371 (c)(1),
(2), (4) Date: Jan. 12, 2007

(87) PCT Pub. No.: WO2005/031457

PCT Pub. Date: Jul. 4, 2005

(65) Prior Publication Data

US 2007/0204415 A1    Sep. 6, 2007

(30) Foreign Application Priority Data

Sep. 25, 2003    (DE) .............................. 203 15 149 U

(51) Int. Cl.
*G03D 15/00*    (2006.01)
(52) U.S. Cl. ............................. 352/130; 15/1.51; 15/100
(58) Field of Classification Search ................... 352/166, 352/130; 15/100, 1.51
See application file for complete search history.

(56) References Cited

U.S. PATENT DOCUMENTS

| 4,145,231 A | * | 3/1979 | Heckman ........................ 134/9 |
| 4,211,580 A | * | 7/1980 | Vowles .......................... 134/9 |
| 4,925,779 A | | 5/1990 | Policht et al. |
| 5,423,104 A | * | 6/1995 | West ............................ 15/100 |
| 5,979,011 A | * | 11/1999 | Miyawaki et al. ............. 15/308 |
| 6,359,675 B1 | | 3/2002 | Enon et al. |

FOREIGN PATENT DOCUMENTS

DE        689 21 055 T2    5/1990

(Continued)

OTHER PUBLICATIONS

International Search Report, dated Mar. 10, 2005, corresponding to PCT/DE2004/002163.

(Continued)

*Primary Examiner*—William C Dowling
(74) *Attorney, Agent, or Firm*—Christie, Parker & Hale LLP

(57) ABSTRACT

A motion picture camera is provided having a film magazine inside of which a film supply reel, from which a motion picture film to be exposed having a supporting layer and a light-sensitive emulsion layer is unwound and moved over a film conveying path past a picture window for picture exposure and a film winding reel are placed, onto which the exposed motion picture film is wound. A device, which serves to remove foreign bodies located on one or both surfaces of the motion picture film, is placed in the film conveying path between the film supply reel inside the film magazine and the picture window.

12 Claims, 2 Drawing Sheets

FOREIGN PATENT DOCUMENTS

| | | |
|---|---|---|
| DE | 689 21 055 T2 | 6/1995 |
| DE | 298 00 862 U1 | 3/1998 |
| DE | 298 00 862 U 1 | 4/1998 |
| EP | 0 355 407 A1 | 7/1989 |
| EP | 0 355 407 A1 | 2/1990 |
| GB | 639858 | 7/1950 |
| GB | 639858 A | 7/1950 |

OTHER PUBLICATIONS

English translation of International Preliminary Examination Report for corresponding PCT application No. PCT/DE2004/002163.

* cited by examiner

MOTION PICTURE CAMERA HAVING A FILM MAGAZINE AND MEANS FOR CLEANING THE FILM

CROSS-REFERENCE TO RELATED APPLICATION

This application is a National Phase Patent Application of International Application Number PCT/DE2004/002163, filed on Sep. 23, 2004, which claims priority of German Utility Model Number 203 15 149.6, filed on Sep. 25, 2003.

BACKGROUND

The invention relates to a motion picture camera having a film magazine.

During the use of a motion picture film, dust, fluff or other foreign bodies on the surface of a motion picture film, in particular on the side of the light-sensitive emulsion layer of the motion picture film, can lead to damage of the film surface, inter alia in the form of scratches, which, during the subsequent film development, film processing and projecting of the motion picture film, can no longer be removed and are extremely disruptive. In particular during the film transport within the motion picture camera, in which the motion picture film is unwound from a film supply reel arranged inside a film magazine connected to the motion picture camera, is fed via what is known as a "magazine mouth" of the film camera, over a feed sprocket to the picture window, where the motion picture film is exposed, and transported over a take-up sprocket and the magazine mouth back to the film magazine and there the exposed motion picture film is wound up onto a winding reel, the surfaces of the motion picture film can come into contact with parts of the motion picture, and in particular the film transport mechanism and, in the process, the foreign bodies on the surfaces can cause scratches on the surface of the motion picture film. However, even without contact with parts of the film transport mechanism, grains of dust, fluff or other foreign bodies on the emulsion layer surface of the motion picture film would lead to their covering the emulsion layer at this point, so that the relevant film picture remains unexposed at this point during exposure in the picture window of the motion picture camera and causes disruption during the subsequent viewing.

In order to pick up fluff on a motion picture film, DE 298 00 862 U1 discloses a viewing device, with which fluff and other undesired objects on a motion picture film or in the vicinity of the motion picture film can be observed trough the picture window of a motion picture camera. The viewing device is positioned on or in the vicinity of the objective of the motion picture film for this purpose and the picture window is illuminated by a light source, in order to make the motion picture film in the picture window visible through the objective and therefore to detect and remove fluff on the motion picture film.

However, viewing the motion picture film through the objective is extremely complicated and requires a special illuminating device in order to avoid exposing the motion picture film when viewing the film before the actual film exposure. Furthermore, the removal of the fluff requires the motion picture film to be stopped, which is impossible or virtually impossible at conventional motion picture speeds. The handling required is complicated and needs an additional viewer of the motion picture film, so that the known viewing device is impractical and unsuitable for film recordings.

DE 689 21 055 T2 discloses applying transparent protective film strips with an adhesive coating to the surfaces of a photographic strip, the edges of the photographic strip, provided with perforations, remaining uncovered. The intention is thereby to avoid the negative images on the original photographic strip being scratched or damaged in any other way as a result of clumsy handling during the film recording or during the development, or dust, fluff, foodstuffs and other foreign materials coming into contact with the photographic strip and remaining caught there, so that cleaning or retouching of the film is required in order to obtain a good reproduction or enlargement of the pictures.

This method is suitable for protecting photographic films for still image cameras but not for motion picture films in conjunction with motion picture cameras, since either the still unexposed motion picture film would have to be provided with the protective films on both sides and therefore, with a predefined film length. Consequently, such film could no longer be accommodated in a conventional film magazine. Fitting protective films in the course of the motion picture camera likewise fails, since complicated additional devices would be required for this, which cannot be reconciled with the use and the operation of a motion picture camera. In addition, even the known method could not prevent fluff or other foreign bodies adhering to the emulsion-side protective film, so that the motion picture film is not exposed at this point during the exposure of the film pictures in the picture window of the motion picture camera and, as a result, disruptive shadows remain on the motion picture film.

SUMMARY

It is an object of the present invention to specify a motion picture camera having a film magazine of the type mentioned at the beginning with which grains of dust, fluff or other foreign bodies on the surfaces of the motion picture film, in particular on the emulsion layer of the motion picture film, are removed reliably and at little cost before the exposure of the motion picture film, and simple handling is ensured.

BRIEF DESCRIPTION

The solution according to the invention provides a motion picture camera having a film magazine with which grains of dust, fluff or other foreign bodies on the surfaces of a motion picture film are removed reliably and at little cost and simple handling before or after the exposure of the film is ensured when the motion picture camera is at a standstill, for example during renewed filling of the film magazine.

In principle, a separating device can be disposed opposite one or both surface sides of the motion picture film, that is to say both on the side of the light-sensitive emulsion layer and on the side of the carrier layer. Because of the aforementioned problems of foreign bodies on the light-sensitive emulsion layer, however, the separating device is preferably disposed on the side of the emulsion layer of the motion picture film.

The foreign bodies on the surface or the surfaces of the motion picture film can be wiped off or, according to an advanced feature of the invention, can be picked up by the separating device, so that the foreign bodies are bound by the separating device.

An optimum location for disposing the separating device is the region between the film supply reel of the film magazine and the connection of the film magazine to the motion picture camera, in particular in the region of the magazine mouth.

The separating device preferably comprises a cleaning roller having a particle pick-up means and rolling on the side of the light-sensitive emulsion layer of the motion picture film.

The cleaning roller used can be the film feed roller disposed on the side of the light-sensitive emulsion layer of the motion picture film in the film magazine and provided with a particle pick-up means or a cleaning sleeve provided with a particle pick-up means, which can be plugged onto the film feed roller of the film magazine disposed on the side of the light-sensitive emulsion layer of the motion picture film.

The particle pick-up means is preferably implemented by an adhesive layer detaching the foreign bodies from the surface of the motion picture film. After each exposed film roll or another predefined interval, for example every ten rolls of film, the adhesive layer is renewed by replacing the cleaning roller bearing the adhesive layer and, as a result, it is ensured that, depending on the level of soiling of the motion picture film, the requisite separating function is ensured.

The replacement of the cleaning roller bearing the adhesive layer can be carried out by replacing the film winding roller or the cleaning sleeve which can be connected to the film winding roller, by either the film feed roller with the adhesive layer applied thereto being pulled axially off a roll axis of the film feed roller or by the cleaning sleeve being separated axially from the film feed roller and a cleaning sleeve provided with a new adhesive layer being plugged axially onto the film feed roller.

As a result of the ability to remove the cleaning roll easily, in particular when it is disposed in the region of the magazine mouth of the film magazine, easy replacement and therefore high acceptance in the use of the separating device are ensured.

The adhesive layer preferably consists of one side of a double-sided adhesive tape.

This embodiment ensures a simple and economic separating device, in which the double-sided adhesive tape is stuck onto the cylindrical surface of the cleaning sleeve that can be plugged onto the film feed roller or onto the cylindrical surface of the film feed roller.

In the event of a three-roller drive in the magazine mouth of a film magazine, with a central drive roller and an feed roller and the winding roller disposed on the two sides of the drive roller, the result is a particularly simple construction for replacement of a film feed roller or, in the event the cleaning of the motion picture film is provided on both sides, easy replacement of the film feed roller and the central drive roller.

As an alternative to a separating device having a double-sided adhesive tape, the separating device can comprise an electrostatic pick-up device, which is disposed opposite the surface side bearing the light-sensitive emulsion layer or opposite both surface sides of the motion picture film.

The ability to replace the cleaning roller(s) or the electrostatic pick-up device easily is made possible by a closure disposed on the side of the film magazine, in particular the magazine mouth, or the camera housing.

BRIEF DESCRIPTION OF THE DRAWINGS

By using exemplary embodiments illustrated in the drawing, the idea on which the invention is based is to be explained in more detail. In the drawing.

DETAILED DESCRIPTION

Figure 1:
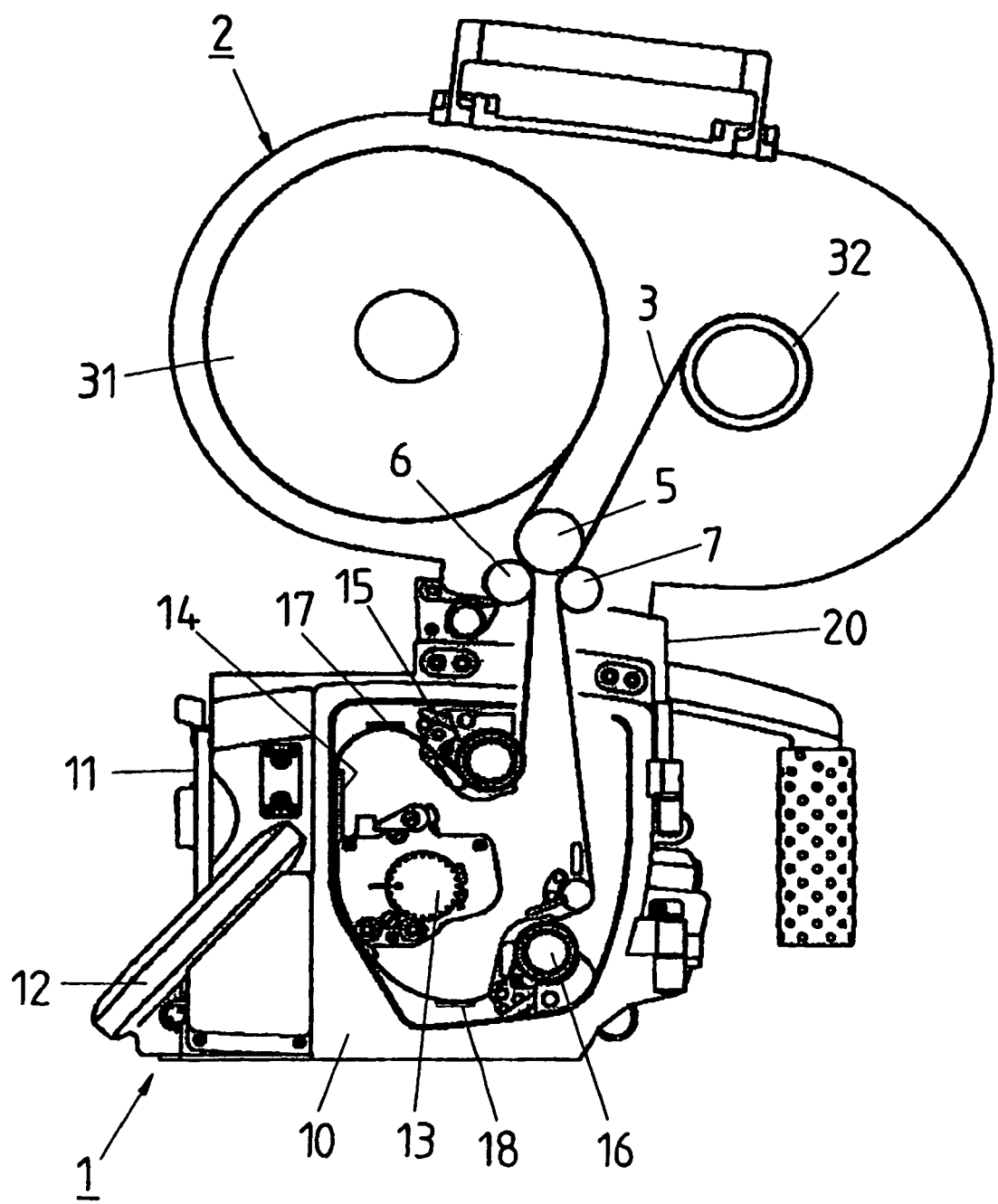
FIG. 1 shows a section through a motion picture camera with a coupled film magazine and a film feed roller arranged in the magazine mouth and used as a cleaning roller.

FIG. 1 shows a section through a motion picture camera 1 with coupled film magazine 2, in which a still unexposed motion picture film 3 is wound up on a film supply reel 31 disposed in the film magazine 2. The motion picture film 3 is led over a film transport path through the motion picture camera 1, is exposed there and then wound up onto a film roller 32 accommodating the exposed motion picture film 3.

The motion picture camera 1 has a camera housing 10, on the front side of which an objective fixing to hold and fix a camera objective and which is provided with a bulge in the form of a cylindrical disk in order to hold a rotating mirror shutter 12, which deflects the recording beam path passing through the camera objective alternately into a viewfinder and video beam path and lets it through to a picture window 14 for the purpose of film exposure.

The motion picture film 3 is moved intermittently past the picture window 14 by a gate mechanism 13. The still unexposed motion picture film 3 is pulled continuously off the film supply reel 31 in the film magazine 2 by a first film transport sprocket 15 and is transported into the motion picture camera 1 where, in order to compensate for the continuous film transport of the first film transport sprocket 15 and the intermittent operation of the gate mechanism 13, and a loop of film is formed, the size of which is regulated by a first loop sensor 17. After the film exposure in the picture window 14, the motion picture film 3 is transported continuously to the film roller 32 in the film magazine 2 by a second film transport sprocket 16, a loop of film also being formed here in order to compensate for the intermittent film transport by the gate mechanism 13 and the continuous film transport by the second film transport sprocket 16, the size of said loop being regulated by a second loop sensor 18.

In the magazine mouth 20 of the film magazine 2, coupled to a magazine holder of the motion picture camera 1, there are three film transport rollers 5, 6, 7, of which the central film transport roller 5 is driven and drives the film feed roller 6 and the film winding roller 7 via the motion picture film 3 clamped in between the film transport roller 5 and the film feed roller 6, on the one hand, and the film transport roller 5 and the film winding roller 7, on the other hand.

The film transport roller 5 can either be connected to a dedicated magazine drive or can be connected via drive means to the film transport motor driving the film sprockets 15, 16 or film transport motors driving the film sprockets 15, 16 separately.

If particles such as grains of dust, fluff or other foreign bodies adhere to the surface of the unexposed motion picture film 3 wound up on the film supply reel 31, in particular to its surface having the light-sensitive emulsion layer, these can cause scratches on the film surface on the film transport path from the film supply reel 31 to the picture window 14, which, in the case of the light-sensitive emulsion layer, lead to an impairment of the quality of the motion picture film 3 or, in the event that they also remain during the film exposure in the picture window 14, cause unexposed "black" flecks, which reduce the recording quality considerably.

In order to prevent this, the film feed roller 6 is formed as a cleaning roller and provided with an adhesive layer, on which grains of dust, fluff or other foreign bodies are detached from the surface of the motion picture film 3 during the transport through the gap between the drive roller 5 and the film unwinding or cleaning roller 6. The particles detached from the film surface remain on the adhesive layer of the film unwinding or cleaning roller, which is replaced after a predefinable interval.

The replacement itself is carried out in a simple way via a closure at the magazine mouth 20, by the film feed roller 6 being pulled off a roller axis 4 in the axial direction, and a film feed roller 6 provided with an adhesive layer free of foreign bodies being plugged onto the roller axis 4 in the axial direction.

Figure 2:
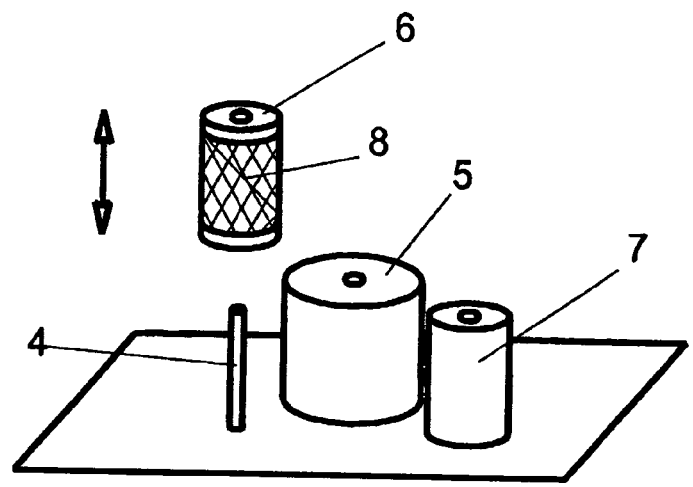
FIG. 2 shows a schematic perspective illustration of the film feed roller according to FIG. 1 disposed in the magazine mouth and provided with a double-sided adhesive tape.
Figure 3:
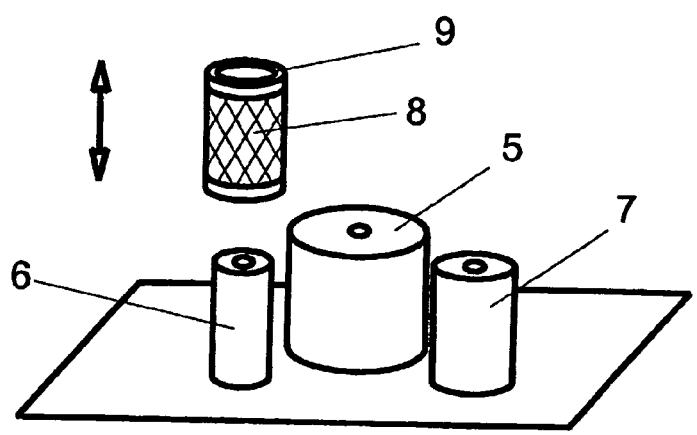
FIG. 3 shows a schematic perspective illustration of a cleaning sleeve that can be plugged onto the film feed roller and has a double-sided adhesive tape, and FIG. 4 has a schematic perspective illustration of a cleaning roller disposed in the magazine mouth of a film magazine and having a circumferential groove to hold a double-sided adhesive tape.
Figure 4:
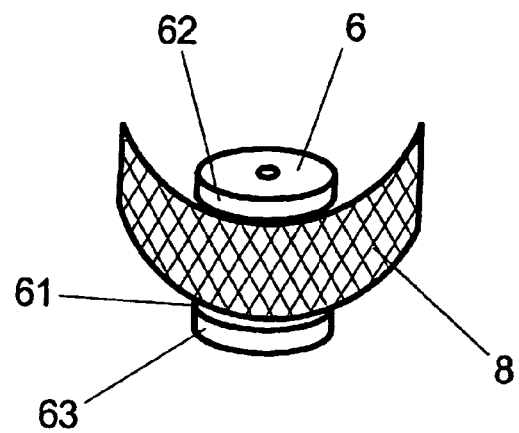

Different design variants of a cleaning roller provided with an adhesive layer are illustrated perspectively in FIGS. 2 to 4.

In the embodiment according to FIG. 2, a film feed roller 6 used as a transport and cleaning roller is pulled off the roll axis 4 and plugged onto the roll axis 4 axially in the direction of the double arrow and has an adhesive layer 8 on its cylindrical surface in order to detach particles on the surface of the motion picture film 3 provided with the light-sensitive emulsion layer.

The adhesive layer 8 preferably consists of a double-sided adhesive tape, which is stuck in a simple way to the cylindrical surface of the film feed roller 6. In the event of a necessary replacement, the double-sided adhesive tape is pulled off the film feed roller 6 and a new double-sided adhesive tape is applied to the cylindrical surface of the film feed roller 6, or an appropriately prepared film feed roller 6 is inserted.

In the perspective illustration according to FIG. 3, the film feed roller 6 remains permanently installed, while a hollow cylindrical cleaning sleeve 9 with an adhesive layer 8 applied thereto is placed on the film feed roller 6 and locked. In this embodiment, the diameter of the film feed roller 6 is reduced by the thickness of the cleaning sleeve 9 in order to achieve the same relationships as in the arrangement according to FIG. 2. In this embodiment, too, the adhesive layer 8 preferably consists of a double-sided adhesive tape which is applied to the outer cylindrical surface of the cylindrical sleeve 9.

FIG. 4 shows, in a perspective view, a cleaning roller 6 which has a circumferential groove 61 corresponding at least to the width of the film exposure surface of the motion picture film, which is adjoined on both sides by cylindrical, elevated surfaces 62, 63. The circumferential groove 61 is used to accommodate a double-sided adhesive tape 8 the thickness of which is dimensioned such that, after the double-sided adhesive tape 8 has been stuck on, the circumferential groove 61 is filled completely and an even cylindrical surface is ensured.

In an addition to the embodiments described above, in order to detach particles from both surfaces of the motion picture film 3, the drive roller 5 can also be provided with an adhesive layer, in particular with a double-sided adhesive tape.

One alternative to the solution according to the invention consists in providing an electrostatic pick-up device instead of an adhesive layer as a separating device for detaching particles on the surface or the surfaces of the motion picture film. The electrostatic separating device can be set up and disposed in such a way that no electrostatic charging of the motion picture film takes place and the particles detached from the surface or the surfaces of the motion picture film are picked up in a suitable pick-up device, for example in accordance with the above described exemplary embodiments having an adhesive surface.

The invention claimed is:

1. A motion picture camera comprising:
    a film magazine, in which there are disposed a film supply reel, from which a motion picture film to be exposed having a carrier layer and a light-sensitive emulsion layer is discharged and is moved over a film transport path past a picture window for picture exposure,
    a film winding reel, onto which the exposed motion picture film is wound, and
    a device for separating foreign bodies on one of one or both surfaces of the motion picture film being disposed in the film transport path between the film supply reel in the film magazine and the picture window,
    wherein the separating device comprises a cleaning roller having a particle pick-up means and rolling on the side of the light-sensitive emulsion layer of the motion picture film, wherein the pick-up means comprises an adhesive layer for detaching the foreign bodies from the light-sensitive emulsion layer of the motion picture film and picking up the foreign bodies, and wherein the adhesive layer comprises of double-sided adhesive tape, and
    wherein the cleaning roller comprises a film feed roller in the film magazine disposed on the side of the light-sensitive emulsion layer of the motion picture film.

2. The motion picture camera according to claim 1, wherein the separating device is disposed on the side of the light-sensitive emulsion layer of the motion picture film.

3. The motion picture camera as claimed in claim 1, wherein the separating device picks up the foreign bodies on the surface or the surfaces of the motion picture film.

4. The motion picture camera as claimed in claim 1, wherein the separating device is disposed between the film supply reel and the connection between the film magazine and the motion picture camera.

5. The motion picture camera as claimed in claim 1, wherein the cleaning roller comprises a cleaning sleeve which is pluggable onto the film feed roller of the film magazine disposed on the side of the light-sensitive emulsion layer of the motion picture film.

6. The motion picture camera as claimed in claim 1, wherein the adhesive layer is replaceable.

7. The motion picture camera as claimed in claim 1, wherein the cleaning roller is replaceable.

8. The motion picture camera as claimed in claim 7, wherein the cleaning roller can be pulled axially off a roller axis.

9. The motion picture camera as claimed in claim 7, wherein the cleaning sleeve loaded with foreign bodies can be pulled axially off the film feed roller and a cleaning sleeve free of foreign bodies is pluggable axially onto the film feed roller.

10. The motion picture camera as claimed in claim 1, wherein the separating device is accessible via a closure disposed on the side of the film magazine or the camera housing.

11. A motion picture camera comprising:
    a film magazine, in which there are disposed a film supply reel, from which a motion picture film to be exposed having a carrier layer and a light-sensitive emulsion layer is discharged and is moved over a film transport path past a picture window for picture exposure,
    a film winding reel, onto which the exposed motion picture film is wound, and
    a device for separating foreign bodies on one of one or both surfaces of the motion picture film being disposed in the film transport path between the film supply reel in the film magazine and the picture window,
    wherein the device for separating comprises a cleaning roller having a particle pick-up means comprising an electrostatic pick-up device and rolling on the side of the light-sensitive emulsion layer of the motion picture film and
    wherein the cleaning roller comprises a film feed roller in the film magazine disposed on the side of the light-sensitive emulsion layer of the motion picture film.

12. The motion picture camera as claimed in claim 11, wherein the electrostatic pick-up device is disposed on both surface sides of the motion picture film.

* * * * *

UNITED STATES PATENT AND TRADEMARK OFFICE
CERTIFICATE OF CORRECTION

| | | |
|---|---|---|
| PATENT NO. | : 7,751,024 B2 | Page 1 of 1 |
| APPLICATION NO. | : 10/573612 | |
| DATED | : July 6, 2010 | |
| INVENTOR(S) | : Walter Trauninger | |

It is certified that error appears in the above-identified patent and that said Letters Patent is hereby corrected as shown below:

In the Claims

Column 6, Claim 1, line 5                Delete "of"

Signed and Sealed this
Fifteenth Day of March, 2011

David J. Kappos
*Director of the United States Patent and Trademark Office*